United States Patent
Ganti et al.

(10) Patent No.: US 8,096,610 B2
(45) Date of Patent: Jan. 17, 2012

(54) FLOOR TOP CROSSMEMBER

(75) Inventors: Satish Ganti, Canton, MI (US); Edward Andrew Pleet, Livonia, MI (US); Naijiang Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 12/142,198

(22) Filed: Jun. 19, 2008

(65) Prior Publication Data

US 2009/0315363 A1    Dec. 24, 2009

(30) Foreign Application Priority Data

Aug. 30, 2007  (CN) ...................... 2007 2 0175296 U (51) Int. Cl.
*B60N 3/00* (2006.01)

(52) U.S. Cl. ................. 296/193.02; 224/275; 296/37.15; 297/188.1

(58) Field of Classification Search .................. 206/335; 224/42.32, 42.33, 275; 296/37.14, 37.15, 296/65.05, 193.02; 297/188.08, 188.09, 297/188.1, 188.12, 188.13; 312/235.2, 235.5, 312/235.9
See application file for complete search history.

(56) References Cited

U.S. PATENT DOCUMENTS

| | | | |
|---|---|---|---|
| 2,465,770 A * | 3/1949 | Voisk ......................... | 296/37.15 |
| 5,039,155 A * | 8/1991 | Suman et al. ............... | 296/65.03 |
| 5,667,115 A * | 9/1997 | Verhaeg ........................ | 224/275 |
| 5,895,086 A * | 4/1999 | Carico .......................... | 296/37.6 |
| 5,902,009 A * | 5/1999 | Singh et al. ................. | 297/188.1 |
| 5,957,521 A * | 9/1999 | Schlachter .................. | 296/37.15 |
| 6,082,802 A * | 7/2000 | Vigilante, Jr. .............. | 296/37.15 |
| 6,106,044 A * | 8/2000 | Schlachter .................. | 296/37.15 |
| 6,386,612 B2 * | 5/2002 | Hofmann et al. ........... | 296/37.15 |
| 6,488,327 B1 * | 12/2002 | Pearse et al. ................ | 296/65.05 |
| 6,540,279 B1 * | 4/2003 | Bargiel ....................... | 296/65.05 |
| 6,568,745 B2 * | 5/2003 | Kosuge et al. ............ | 296/193.02 |
| 6,644,523 B1 * | 11/2003 | Salas ............................ | 224/275 |
| 6,752,443 B1 | 6/2004 | Thompson et al. | |
| 6,824,029 B2 * | 11/2004 | Tuel et al. .................... | 224/275 |
| 6,837,531 B2 * | 1/2005 | Mack et al. ................. | 296/65.09 |
| 6,983,526 B2 * | 1/2006 | Duffy et al. ...................... | 29/514 |
| 7,004,274 B2 * | 2/2006 | Shibasawa et al. .......... | 180/68.5 |
| 7,073,823 B2 * | 7/2006 | Morino et al. ............. | 280/801.1 |
| 7,090,274 B1 * | 8/2006 | Khan et al. ................. | 296/37.16 |
| 7,140,658 B2 * | 11/2006 | Maceri et al. ............... | 296/37.15 |
| 7,300,088 B1 * | 11/2007 | Catenacci et al. .......... | 296/37.15 |
| 7,562,924 B2 * | 7/2009 | Schultz et al. ............... | 296/37.14 |
| 2006/0181103 A1 * | 8/2006 | Khan et al. ................. | 296/37.14 |
| 2009/0115229 A1 * | 5/2009 | Messner et al. ............ | 297/188.1 |
| 2009/0121510 A1 * | 5/2009 | Kim et al. ................... | 296/24.33 |

FOREIGN PATENT DOCUMENTS

| | | |
|---|---|---|
| EP | 1097857 | 5/2001 |
| JP | 05050885 A * | 3/1993 |
| JP | 05069862 A * | 3/1993 |
| JP | 10129534 | 5/1998 |

\* cited by examiner

*Primary Examiner* — Glenn Dayoan
*Assistant Examiner* — Paul Chenevert
(74) *Attorney, Agent, or Firm* — O'Brien Jones, PLLC (57) ABSTRACT

A device for securing a rear seat within a cab of a vehicle, comprising a crossmember configured for attachment to a floor pan of the vehicle, the crossmember cooperating with the floor pan to provide a cavity for storing items within the cab. When the crossmember is attached to the floor pan and the rear seat is attached to the crossmember, the crossmember is contained within the space between the seat and the floor pan without extending into a passenger leg room area.

18 Claims, 7 Drawing Sheets

FLOOR TOP CROSSMEMBER

This application claims priority to China Patent Number 200720175296.6, filed Aug. 30, 2007.

FIELD OF THE INVENTION

The present teachings relate generally to a structural crossmember for a vehicle body. The present teachings relate more specifically to a crossmember attached to a vehicle floor pan within an interior of the vehicle.

BACKGROUND OF THE INVENTION

Some pickup truck designs include an extended cab with forward-facing rear seats. A problem associated with placing rear seats in the pickup truck cab is that it reduces the storage capacity of the cab, because the presence of the rear seats and associated desirable legroom for rear seat occupants can interfere with the ability to store objects such as jack packages, subwoofers, and other cargo.

It can be desirable in production vehicle bodies including pickup trucks with extended cabs, to have a flat floor pan in the rear occupant foot rest area, in front of the rear vehicle seats. A flat floor pan provides a friendly surface to slide cargo thus making it easy for customers to carry large cargo (e.g. TV package, large boxes, golf bags etc) A flat floor also improves the rear center occupant's sitting stance. Traditional structural elements providing attachment for rear seats and passenger restraints were located under the floor pan, which may not be feasible with certain flat floor pan designs. However, attachment of rear seats and passenger restraints having a given stiffness and strength must nevertheless be accommodated in vehicle's having such a flat floor pan.

Further, it is desirable to facilitate storage in vehicles having such a flat floor pan, although the rear occupant's foot rest area should remain free of designed-in obstacles.

SUMMARY OF THE INVENTION

In accordance with certain embodiments, the present teachings provide a device for securing a rear seat within a cab of a vehicle, comprising a crossmember configured for attachment to a floor pan of the vehicle, the crossmember cooperating with the floor pan to provide a cavity for storing items within the cab. When the crossmember is attached to the floor pan and the rear seat is attached to the crossmember, the crossmember is contained within the space between the seat and the floor pan without extending into a passenger leg room area.

In accordance with certain embodiments, the present teachings also provide a crossmember configured to be attached to a vehicle floor pan within an interior of a vehicle and cooperate with the floor pan to create a cavity for storage. The crossmember comprises a top portion, a front face, and two side portions, at least the side portions including mounting holes configured for attachment of a vehicle seat and a vehicle occupant restraint.

Certain embodiments of the present teachings also provide a method for securing a seat within a vehicle having a floor pan and providing item storage in an interior of the vehicle. The method comprises attaching a crossmember to the floor pan in an interior of the vehicle to create a cavity between the crossmember and the floor pan, the crossmember comprising seat mounting holes for the seat and an opening for accessing the cavity for item storage, and mounting the seat to the crossmember using at least the seat mounting holes.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain certain principles of the teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a lightweight, assembly-feasible, structural crossmember that is assembled on top of a vehicle floor pan in a vehicle interior and provides one or more of structural support for vehicle seats, structural support for occupant restraint anchors, storage space to house a jack package, additional storage space, and a mounting area for a items such as a subwoofer, to be secured under a vehicle seat. In accordance with certain exemplary embodiments of the present teachings, the crossmember can weigh, for example, about 10 pounds and be cost effective because it is within the vehicle interior and therefore does not need to be galvanized.

In accordance with certain embodiments of the present teachings, the crossmember provides attachments points for vehicle seats, restraints, a jack or jack package, and other items such as a subwoofer. The crossmember can be designed so that items such as a jack or jack package can be stored in a cavity created between the crossmember and the vehicle floor. In accordance with certain embodiments, the crossmember can include stiffening beads that provide structural stiffness without increasing crossmember weight. In certain embodiments, the crossmember has a three-piece design including a center portion and two side portions, and the side portions can comprise high-strength steel for increased strength and also have an increased thickness for increased strength. The increased strength of the side portions can support attachment points for the vehicle seats and restraints. In certain embodiments, the center portion need not comprise high strength steel or an increased thickness. The side portions can be attached to the center portion using known fastening techniques such as welding, bolts, adhesives, rivets, etc.

Figure 1:
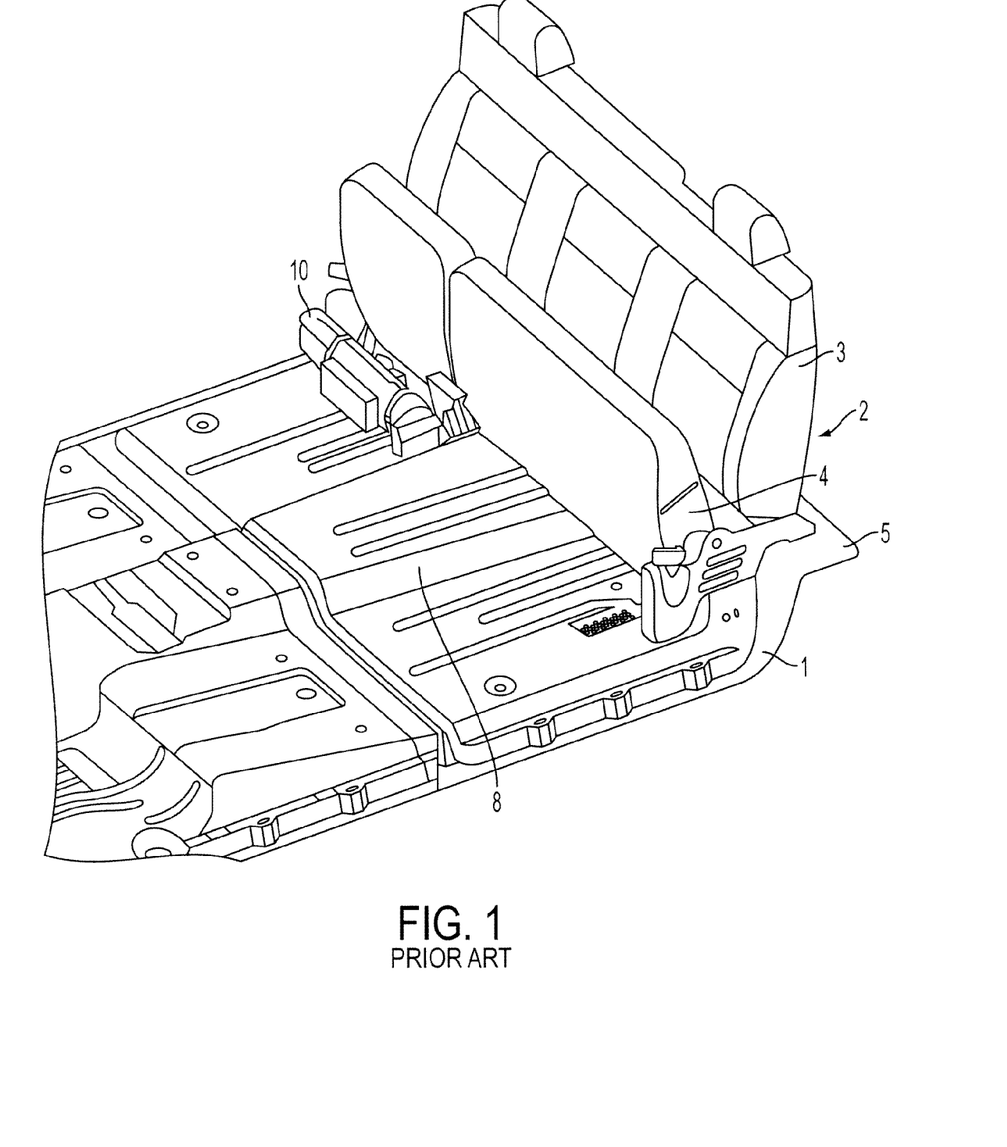
FIG. 1 illustrates a cutaway perspective view of an existing pickup truck crew cab.

FIG. 1 illustrates a cutaway perspective view of a known pickup truck crew cab with a floor pan 1 to which seats 2 are mounted. The seats 2 are typically mounted to reinforced areas of the floor pan 1 where small brackets (not shown) are welded under the floor pan 1. The floor pan 1 includes a raised center portion 8 to accommodate the vehicle's drive shaft. The raised portion 8 can detract from leg room area of rear seat occupants. Occupant leg room area for rear seat occupants comprises the area in front of the rear seat. It can include a space extending from immediately in front of the rear seat to immediately behind a front seat. Seats 2 typically comprise a back portion 3 and a bottom portion 4. Storage, such as for a jack package 10 can be accommodated under the bottom portion 4 of the seat 2. This requires the bottom portion 4 of the seat 2 to have a suitable clearance above the floor pan 1, at least in a location for the jack package storage. At a rear of the cab, the floor pan curves upward to a raised ridge 5. There is no space for interior storage behind the raised ridge 5.

Figure 2:
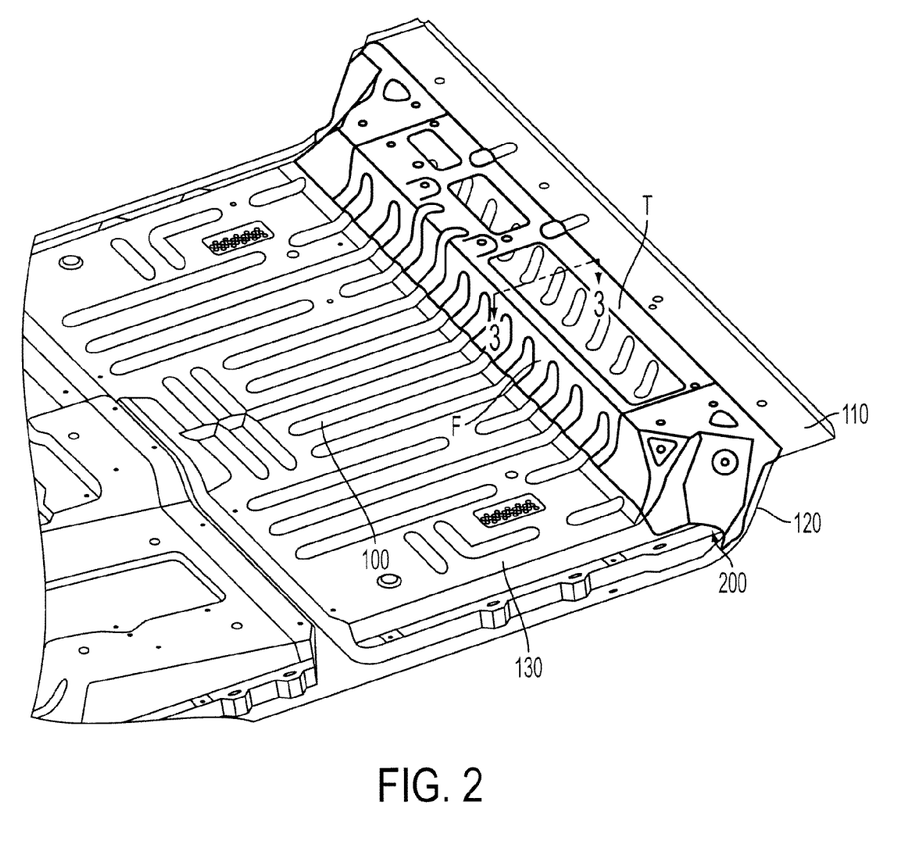
FIG. 2 illustrates a perspective view of an exemplary crossmember embodiment of the present teachings.

FIG. 2 illustrates a cutaway perspective view of an exemplary crossmember embodiment of the present teachings. As can be seen, the crossmember 200 is attached to a flat floor pan 100 of a vehicle. The floor pan is referred to as "flat" because there is no raised center portion like the raised center portion 8 of FIG. 1. In this illustrated exemplary embodiment, the crossmember 200 spans substantially the entire width of the floor pan, although the present teachings contemplate a crossmember that spans less than substantially the entire width of the floor pan. The crossmember 200 can be welded to the floor pan 100, or attached in another known suitable way, such as by using bolts, screws, adhesives, and other fasteners. In certain embodiments of the present teachings, when the crossmember 200 is mounted to the floor pan, a top portion T of the crossmember 200 extends outward from a raised ridge 110 of the floor pan 100. A sloping portion 120 of the floor pan extends downward from the raised ridge 110 to a flat portion 130 of the floor pan. The top portion T of the crossmember 200 can be substantially horizontal or parallel to a portion of the floor pan 100 that it resides above, and extends to a front face F of the crossmember 200. The front face F of the crossmember 200 extends in a substantially downward direction to meet the floor pan 100.

Figure 3:
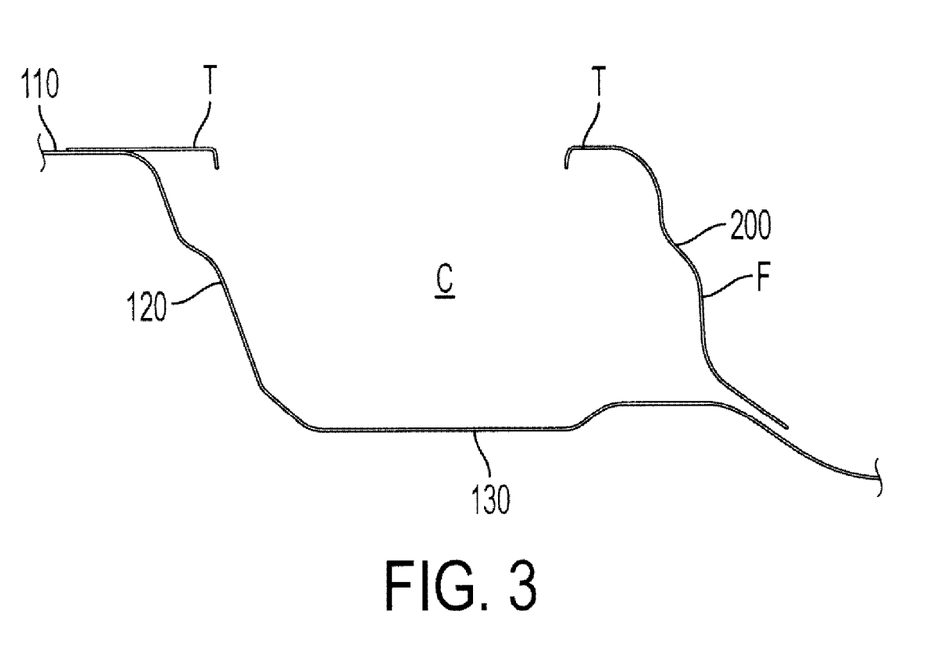
FIG. 3 illustrates a cross sectional view of a storage cavity that can be formed between a vehicle floor pan and the crossmember embodiment of FIG. 2.

FIG. 3 illustrates a cross sectional view of a cavity C that can be formed between the vehicle floor pan 100 and the crossmember 200. The cavity C can be used for storing a variety of items in a location that is unobtrusive, hidden from view, yet easily accessible within the vehicle interior. The cavity C is defined by sloping portion 120 of the floor pan 100, flat portion 130 of the floor pan 100, front face F of the crossmember 200, and top member T of the crossmember 200. In accordance with certain embodiments of the present teachings, the size of the cavity C can depend, for example, on the available clearance between a bottom portion of an overlying vehicle seat and the flat portion 130 of the floor pan 100. Further, in accordance with certain embodiments, the crossmember 200 does not extend beyond a vehicle seat to interfere with occupant leg room. Thus, the size of the crossmember can, in various embodiments, be dictated by the size of the vehicle and the distance between the floor pan and a vehicle seat.

Figure 4:
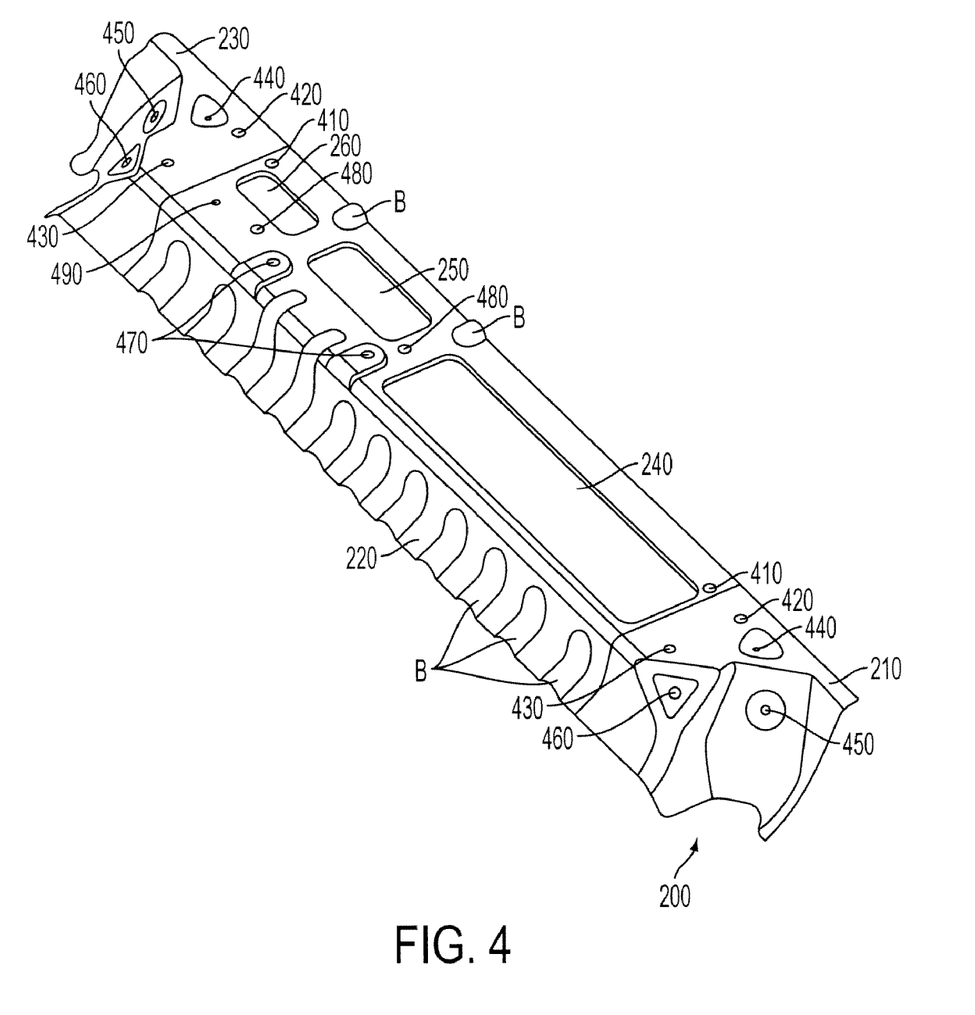
FIG. 4 illustrates a perspective view of the crossmember embodiment of FIG. 2

FIG. 4, which is a perspective view of the crossmember embodiment of FIGS. 2 and 3, illustrates various elements of the exemplary embodiment. The exemplary crossmember embodiment 200 is shown to be a three-piece member, including side portions 210 and 230, and a center portion 220. Constructing the crossmember 200 to comprise three pieces allows the side portions 210, 230 to be stronger than the center portion 220. Stronger side portions 210, 230 can be desirable when the seat and the restraints are attached to the side portions. The side portions 210, 230 can be made stronger, for example, by using a thicker and high strength steel. Three-piece construction also allows the center portion to be thinner and of regular steel, in a case where it needn't be as strong as the side portions, and thus a weight and expense saving is achieved.

In the illustrated exemplary embodiment, the center portion 220 comprises three openings 240, 250, and 260 extending through the top portion T of the crossmember 200. The largest opening 240 can be sized for insertion of stored items such as a jack package (as discussed in more detail below). Openings 250 and 260 can be employed to reduce the amount of material comprising the crossmember 200, thus reducing the overall weight of the crossmember 200. The present teachings contemplate any number of openings in the crossmember, and a variety of suitable sizes and locations for the openings. Indeed, the openings could alternatively be provided on the front face F of the crossmember 200. Strengthening beads B are illustrated on the center portion 220 of the crossmember 200. The beads B can strengthen the crossmember 200 without adding weight. As can be seen in FIG. 2, certain of the beads align with strengthening beads on the floor pan 100 where the crossmember 200 meets the floor pan 100. However, the present teachings contemplate any number of beads, having a variety of sizes and locations. Stiffening beads can additionally or alternatively be provided on the side portions 210, 230.

As illustrated in FIG. 4, the exemplary crossmember embodiment 200 can include, for example, a number of mounting holes 410, 420, 430, 440, 450, 460, 470, 480, and 490. Mounting holes 450 can be provided for passenger restraints and are located in the side portions 210, 230 of the cross member. Mounting holes 460 and 470 can be provided for attachment of a seat to the crossmember. Mounting holes 460 are also located in the side portions 210, 230 of the crossmember. Mounting holes 480 can be provided for attachment of a stored item (e.g., a jack package) within the cavity C. Holes 410, 420, 430, and 440 can be used for locating the portions 210, 220, 230 together for assembly to form full part 200. It is to be understood that the size and location of the mounting holes may vary in accordance with various design considerations, including the shape and size of the seat, the restraint type(s), and the intended storage functionality.

Figure 5:
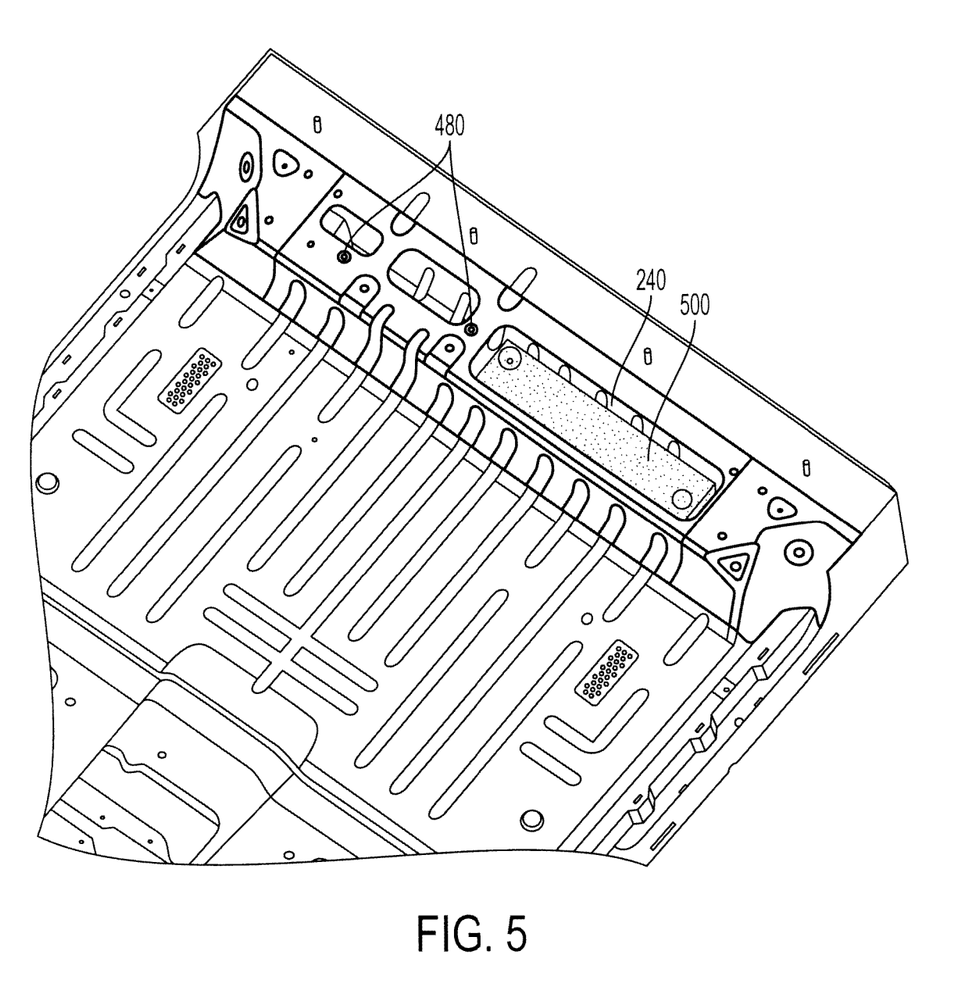
FIG. 5 illustrates a perspective view of the crossmember embodiment of FIG. 2 with an item inserted into the cavity.
Figure 6:
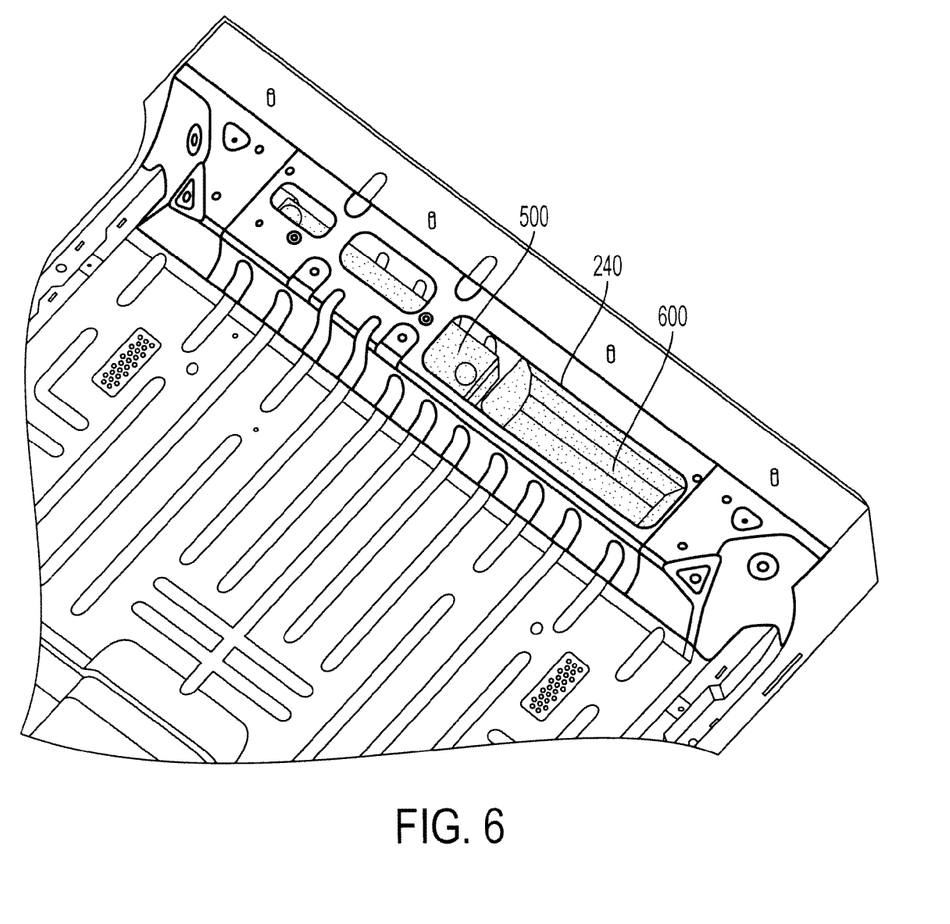
FIG. 6 illustrates a perspective view of the crossmember embodiment of FIG. 2 with two items inserted into the cavity.

FIGS. 5 and 6 illustrate an exemplary placement of one or more items that have been inserted and retained in the cavity C of the crossmember 200. An item 500 (e.g., a jack package) can be inserted into the cavity C formed between the floor pan 100 and the crossmember 200, as shown in FIG. 5. As can be seen, opening 240 is large enough to receive the item 500. Once the item is in the cavity C, it can be moved to the left as shown in FIG. 6. There, it can optionally be secured to the crossmember 200 using mounting holes 480 to keep it from moving when the vehicle is in use. Other detachable securing means are also contemplated, for example latching, belting, etc. Once the item 500 has been secured in the illustrated embodiment, additional suitably-sized items can be inserted into the opening 240, such as item 600 illustrated in FIG. 6. The present teachings also contemplate providing structure (not shown) to secure additional items in the crossmember cavity C.

Figure 7:
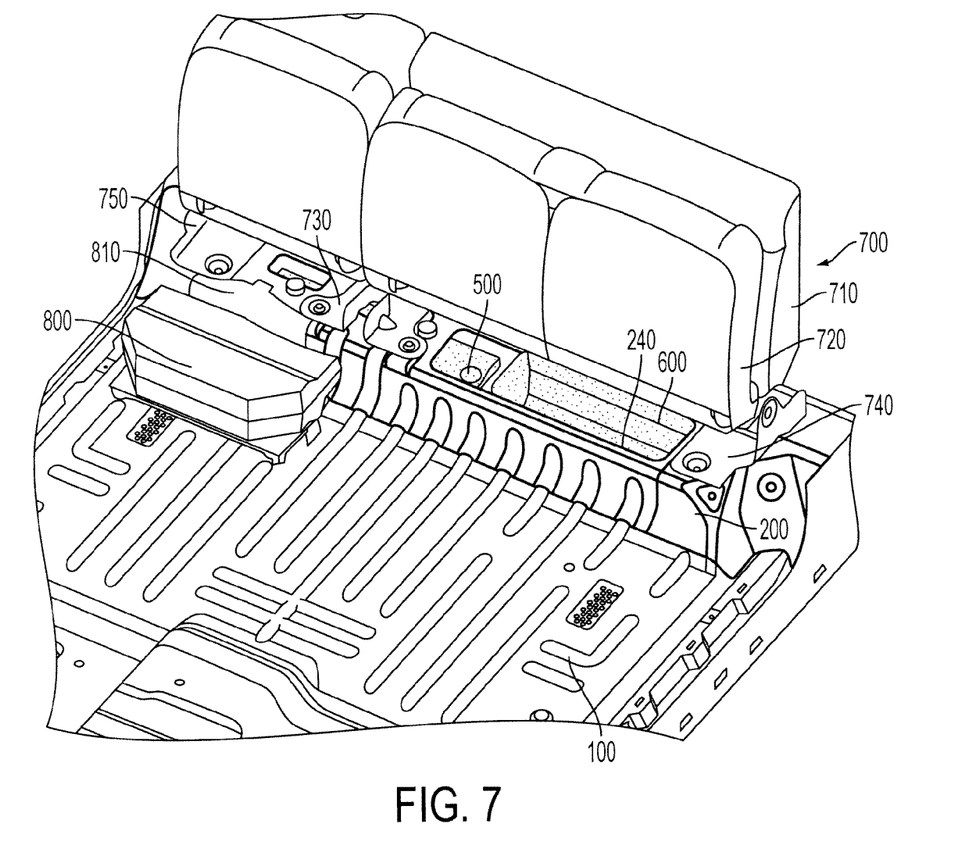
FIG. 7 illustrates a perspective view of the crossmember of FIG. 2 with items stored, a seat attached, and an item secured externally.

FIG. 7 illustrates the exemplary crossmember embodiment 200 of FIGS. 2-6 mounted on a vehicle floor pan 100 and having a seat 700 mounted thereon. The seat 700 includes a seat back portion 710 and a seat bottom portion 720. In the illustrated exemplary embodiment, three mounting brackets 730, 740, and 750 can be used to mount the seat 700 to the crossmember 200. Mounting bracket 730 can be mounted to mounting holes 470 on the center portion 220 of crossmember 200, Mounting brackets 740, 750 can be mounted to mounting holes 460 on the side portions 210, 230 of crossmember 200. It can be seen that, when the seat 700 is mounted to the crossmember 200, a bottom portion 720 of the seat 700 can be lifted to expose the crossmember and the opening 240 for access to stowed items 500 and 600.

Another optional feature of a crossmember 200 in accordance with the present teachings is providing a mounting surface for an exterior item 800, such as a subwoofer, as illustrated in FIG. 7. A mounting bracket 810 can facilitate mounting of the item 800. Thus, the item 800 is secured in a protected, unobtrusive location, but is easily accessible within the vehicle interior, for example by lifting the seat bottom.

The present teachings contemplate a crossmember mounted atop a floor pan in a variety of vehicles, and the present teachings are not intended to be limited to pickup truck crew cabs. Similarly, the present teachings are not contemplated as being limited to vehicles having flat floor pans. The present teachings contemplate a crossmember comprising any known suitably strong material, such as the above-mentioned steel or high-strength steel, or alternatively aluminum or a combination of suitable materials.

While the present teachings have been disclosed in terms of exemplary embodiments in order to facilitate better understanding of the invention, it should be appreciated that the invention can be embodied in various ways without departing from the scope of the invention. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to an opening element includes two or more openings. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A crossmember configured to be attached to a vehicle floor pan within an interior of a vehicle and cooperate with the floor pan to create a cavity for storage, the crossmember comprising:
 a top portion, a front face, and two side portions, at least the side portions including mounting holes configured for attachment of a vehicle seat and a vehicle occupant restraint,
 wherein the top portion and the front face are part of a center portion, and the two side portions are separate from the center portion.

2. The crossmember of claim 1, wherein the side portions are welded to the center portion.

3. The crossmember of claim 1, further comprising an opening in the top portion configured to receive items for storage in a cavity formed between the crossmember and the floor pan when the crossmember is attached to the floor pan.

4. The crossmember of claim 3, further comprising mounting holes configured for attachment of stored items within the cavity.

5. The crossmember of claim 1, wherein each of the side portions comprises a material that is stronger than a material of the center portion.

6. The crossmember of claim 5, wherein the side portions comprise high strength steel and the center portion comprises steel.

7. The crossmember of claim 5, wherein each of the side portions comprises a material having a greater thickness than a material of the center portion.

8. A device for securing a rear seat within a cab of a vehicle having a flat floor pan, the rear seat comprising a back portion and a bottom portion, the bottom portion being pivotable to a stowed position, the device comprising:
 a structural crossmember configured for attachment to the flat floor pan of the vehicle, the structural crossmember configured to attach to the floor pan to provide a cavity for storing items within the cab while the rear seat is deployed and defining a front, a top, and two sides of the cavity, with the floor pan defining the bottom of the cavity, the structural crossmember configured to support the entirety of the rear seat,
 wherein, when the structural crossmember is attached to the floor pan and a rear portion of the rear seat is attached to the structural crossmember, the structural crossmember is contained within the space between the seat and the floor pan to retain stored items without extending into a passenger leg room area or a passenger sitting area.

9. The device of claim 8, wherein the crossmember is configured for securing items stored within the cavity.

10. The device of claim 8, wherein the crossmember is configured for securing an item for storage under the seat, external to the cavity.

11. The device of claim 8, wherein the crossmember is configured for attachment of occupant restraints.

12. The device of claim 8, wherein the cavity for storing items within the cab is accessible through an opening in the crossmember.

13. The device of claim 12, wherein the opening is accessible by lifting the bottom portion of the seat.

14. A method for securing a seat within a vehicle having a flat floor pan and providing item storage in an interior of the vehicle while the seat is deployed and without the item storage extending into a passenger sitting area, the seat comprising a back portion and a bottom portion, the bottom portion being pivotable to a stowed position, the method comprising:
attaching a structural crossmember to the floor pan in an interior of the vehicle to create a cavity between the structural crossmember and the floor pan, the floor pan defining a bottom of the cavity and the structural crossmember defining a front, a top, and two sides of the cavity, the structural crossmember comprising seat mounting holes for the seat and defining an opening for accessing the cavity for item storage, the structural crossmember configured to support the entirety of the seat; and
mounting a back portion of the seat to the structural crossmember using at least the seat mounting holes.

15. The method of claim 14, further comprising mounting occupant restraints to the crossmember.

16. The method of claim 14, further comprising mounting items to an exterior of the crossmember to secure the items under the seat.

17. The method of claim 14, further comprising storing an item in the cavity by inserting the item into the crossmember opening.

18. The method of claim 14, further comprising securing the stored item within the cavity by attaching the item to the crossmember.

* * * * *